Patented Aug. 18, 1953

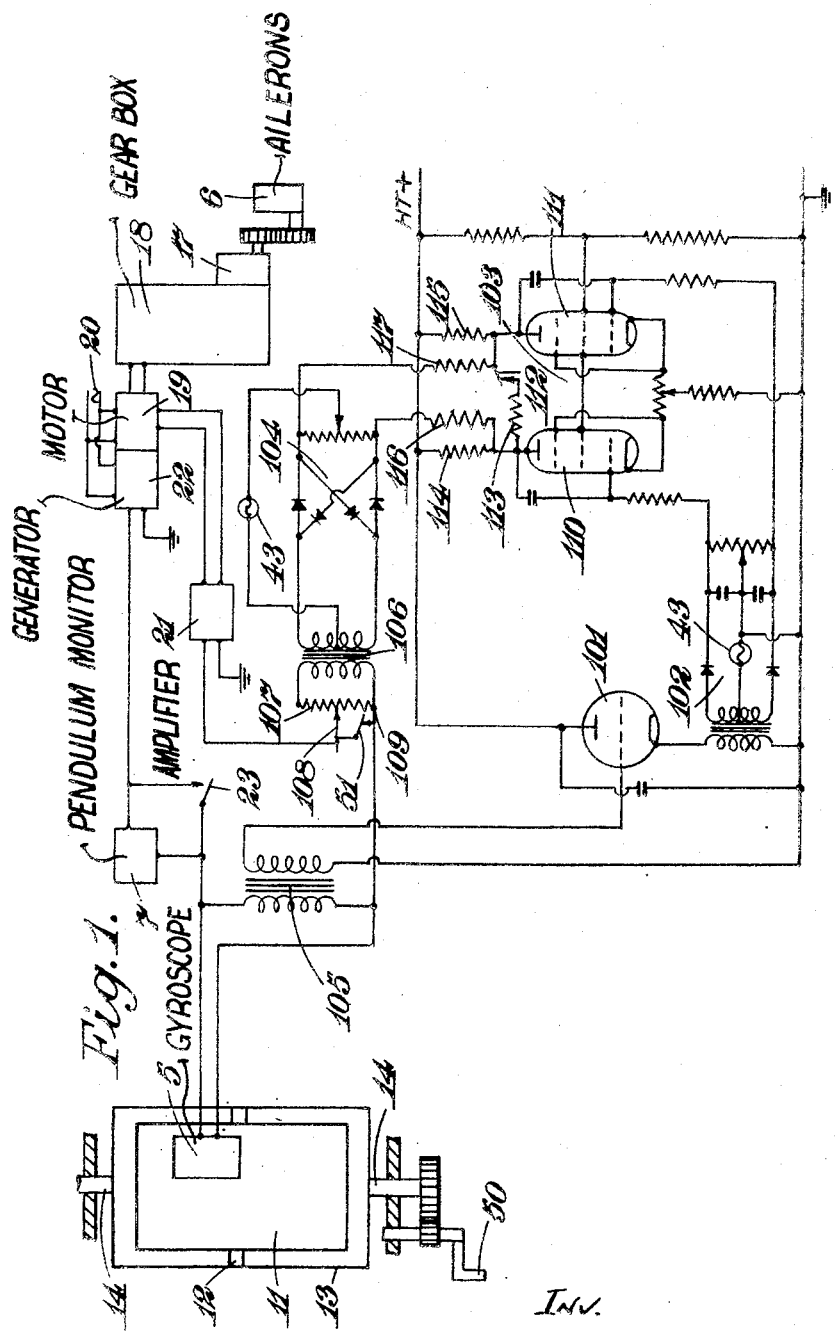

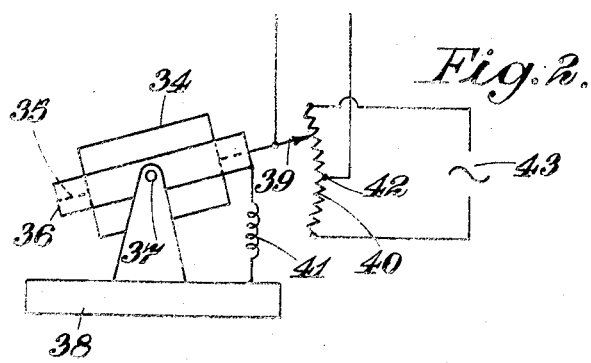
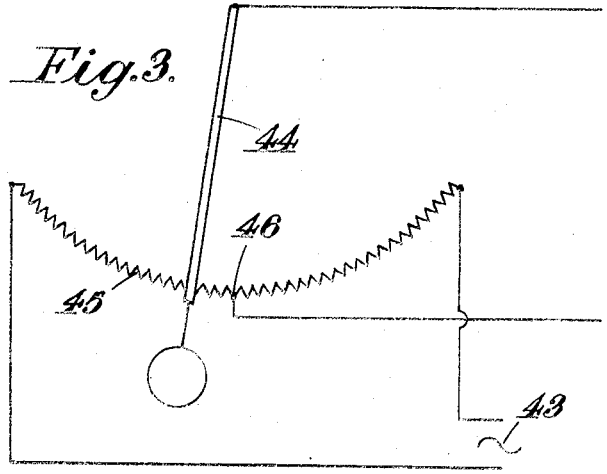

2,649,563

UNITED STATES PATENT OFFICE 2,649,563

STABILIZING APPARATUS IN AIRCRAFT

Frederick William Meredith, London, England, assignor to S. Smith & Sons (England) Limited, London, England, a British company Application June 1, 1948, Serial No. 30,262
In Great Britain May 15, 1947

11 Claims. (Cl. 318—489)

This invention relates to apparatus for stabilising a body in an aircraft against rotational movements of the aircraft. For example the body may be an artificial horizon stabilised by a gyroscope, or the body may be a platform pivotally mounted on an aircraft and stabilised by a motor rotating the platform relatively to the aircraft in response to amplified stabilising signals from a turn detector mounted on the platform or on the aircraft. Alternatively the body may be a platform pivotally mounted on an aircraft and stabilised by control of the aircraft in response to amplified stabilising signals from a turn detector mounted on the platform as in patent application No. 655,684 now Patent Number 2,607,550. Owing to imperfections in such stabilisation, however, the body may wander from its initial or datum position and for this reason it is usual to provide a monitoring control for restoring the body to its datum position in addition to the stabilising control. Thus in the case of a gyroscope in a directional gyro or artificial horizon instrument, the earth's rotation or gimbal friction, or small errors in balance may cause wander, and in the case of motor stabilisation the inertia of the motor may cause transient saturation of the amplifier leading to wander. Such monitoring control is usually exercised by a gravity responsive device, such for example as pendulous shutters controlling air jets in the case of the gyroscope, or a pendulum generating a signal proportional to its angular deflection. Such gravity responsive devices, however, actually introduce wander if the aircraft is subjected to acceleration, for example the acceleration of a turn, and the object of the present invention is to provide a monitoring control which is not disturbed by acceleration forces.

According to the present invention means are provided for measuring the rate of turn of the body, integrating the measured rate of turn and exercising a monitoring control on the body in accordance with the integral of the rate of turn to reduce the integral to zero. Preferably such means are arranged to become operative only when the aircraft is subjected to acceleration forces other than that due to gravity, for example, when the aircraft is executing a turn, a gravity responsive monitoring device being operative at other times.

The invention will be more clearly understood from the following description of an automatic control system for an aircraft about the roll axis, reference being made to the accompanying drawing, in which—

Figure 1 illustrates diagrammatically the layout of the system,

Figure 2 illustrates in further detail the rate-of-turn instrument shown in Figure 1, and Figure 3 illustrates in further detail the pendulum monitor shown in Figure 1.

In Figure 1, 5 is a rate-of-turn gyroscope which is responsive to rate-of-turn in roll. Gyroscope 5 is mounted on the platform 11 gimballed about the pitch axis 12 in a gimbal ring 13 pivoted about the roll axis 14. The platform 11 may be rotated about the roll axis relative to the aircraft by operation of the handle 50 geared to the roll axis 14 of the platform.

A suitably mounted rate-of-turn gyroscope for use as gyroscope 5 is illustrated diagrammatically in Figure 2. As there shown a gyroscope comprises a rotor 34 mounted on spin axis 35 in a gimbal ring 36 gimballed about an axis 37 on a fixed base 38. Carried by the gimbal ring 36 is a potentiometer contact 39 arranged to sweep across a fixed arcuate potentiometer resistance 40 as the ring rotates relatively to the base about the axis 37. The ring 36 is restrained by a spring 41 to a central position in which the contact 39 engages the mid point 42 of the resistance 40. The resistance 40 is connected across the A. C. source 43. The electrical output of the gyroscope appears between the contact 39 and the mid point 42.

Rate-of-turn gyro 34—41 is spring restrained and has only one precessional degree of freedom which is against the spring 41. The only movement of such a rate gyroscope so restrained and so mounted will be due to an actual turn in space. Thus the question of creep or wander or other gradual change of reference position as in the case of a directional gyro mentioned above does not arise in connection with rate-of-turn gyro 34—41.

In operation any turn about an axis normal to the base 38 results in precession of the gyroscope about the axis 37 against the spring restraint to an extent determined by the rate of turn. Hence the output voltage will be proportional to the rate of turn.

Ailerons 6 are coupled through a clutch 17 and gear box 18 to an electric hysteresis motor 19 of the kind described in British patent specification Nos. 576,248 and 576,249. Motor 19 is wound for two-phase operation, one phase (a reference phase) being coupled to an A. C. source 20, and the other phase, the control phase, being coupled to the output of an amplifier 21. Motor 19 is coupled to a hysteresis generator 22 of the kind described in British patent specification No.

576,351. Generator 22 is also wound for two-phase operation, one phase being connected to the source 20 so that an output proportional to the speed of the generator and therefore of the motor is generated in the other phase. The output of the A. C. source 20 is of the same frequency as and in quadrature with that of A. C. source 43.

One output lead of gyroscope 5 is connected through monitor 7 which will be described in more detail hereinafter and the output winding of generator 22 to earth. The other output lead of gyroscope 5 is connected through switch 51 and the input winding of the high gain amplifier 21 to earth. The output from amplifier 21 is applied to motor 19.

A pendulum suitable for use as the pendulum monitor 7 is illustrated diagrammatically in Figure 3. As there shown a pendulum 44 of suitable conducting material is pivoted to swing about an axis parallel to the roll axis. The pendulum 44 sweeps across an arcuate resistance 45 connected to the A. C. source 43, so that the electrical output appears between the pendulum 44 and the mid point 46 of the resistance 45.

If, therefore, the aircraft is not level, the pendulum 44 will be displaced from the mid-point 46 and an A. C. voltage of an amplitude and phase dependent on the displacement of the craft from the level will be generated in the output leads from monitor 7. Switch 23 is provided so that this output may be short-circuited when the aircraft is banked (for a turn) and when a monitoring signal of this nature is not desirable.

The signals from gyroscope 5 and monitor 7 are of the same frequency as source 20 but in quadrature therewith lagging or leading thereon according as the rate-of-roll detected or the deviation from the level is in one direction or another. The signal appearing in the output winding of generator 22 when motor 19 is actuated will be either in phase or antiphase with these signals, according as the rotation of motor 19 is in one sense of the other.

Considering first the operation of the system during straight flight. Switch 23 is then open and switch 51 closed. It will be seen that the sum of three voltages is applied to the input of amplifier 21. These voltages are proportional respectively to the rate of roll, of the aircraft as measured by the rate-of-turn gyroscope 5, the deviation in roll of the aircraft from the horizontal as measured by the pendulum 7 and the speed of the motor 19. The pendulum 7 is purely a monitor, that is it gives a comparatively weak signal compared with those derived from the rate-of-turn gyroscope 5 and the generator 22, and its effect on the operation of the motor 19 during a disturbance may be neglected. The motor 19 operates to reduce the input to the amplifier and since the gain of the amplifier is made very large it will reduce this input substantially to nothing. That is to say during a disturbance the motor will run at such a speed that the output of the generator 22 is substantially equal but opposite to the output of the rate-of-turn device 5, or in other words the motor 19 and therefore the ailerons 6 will be operated at a speed proportional to the rate of roll. This will have the effect of very rapidly stabilising any disturbance in roll. If after the disturbance is stabilised the aircraft is not level in roll, the electrical signal from the roll pendulum 7 will unbalance the system until the aircraft is level.

In order to bank the aircraft, switch 23 is first closed so that the monitor has no action on the circuit. Platform 11 is then rotated about the roll axis 14 by means of handle 50. Gyroscope 5 will then be subjected to a rate of turn in roll and a signal proportional to the rate of turn will be generated in the output leads. Assuming, for the moment, that switch 51 remains closed, this signal will be applied to amplifier 21 to actuate the ailerons to bank the aircraft. The rate of turning of the aircraft in roll will be equal and opposite to the rate-of-roll of the platform relative to the aircraft since the gyroscope will not be subjected to any substantial rate of turn in roll. If the two rates are not equal, there will be a signal from gyroscope 5 which will operate motor 19 to alter the rate of roll until equality is obtained.

In order to bank the aircraft thorugh a certain angle, the platform is thus turned through the same angle relative to the aircraft. The aircraft is maintained at the prescribed angle of bank by the stabilising action of gyroscope 5 in the same manner as stabilisation is effected during level flight.

As was stated above, when the aircraft is banked for a turn, monitor 7 is cut out of action by switch 23.

If pendulum monitor 7 were left in circuit during a turn and the integrating circuit disconnected the platform 11 would not be maintained level in space. During a turn sideslip at any aileron setting is likely to occur because of variation in speed of the craft and a signal would be produced from pendulum 7 causing the aileron to be actuated to a corrected position to counteract the sideslip. This correction counteracts side-slip by changing the angle of bank and therefore the platform 11 will no longer be maintained level in space. Where platform 11 is part of an automatic pilot system such as disclosed in U. S. application S. N. 655,684 the rate of pitch gyro will produce a signal actuating the elevators with the result that at the end of the turn platform 11 will not be level in either pitch or roll.

In the absence of any monitoring control during a turn occasional saturation of the amplifier 21 due to the inertia of the aileron servo motor 19 may permit any asymmetry in the system, particularly aileron hinge moment, to cause a slow wander of the platform 11 about the roll axis. Normal turns to change course are usually of such short duration that no serious departure of the platform from the level position can take place. It may be however that an aircraft will have to circle an airfield for a long period before being given permission to land and such prolonged turns can give rise to serious discrepancies in the position of the platform with the result that the turn of the aircraft will cease to take place about a truly vertical axis.

To overcome this difficulty, the platform is maintained level in space by applying to the control circuit described above a signal proportional to the integral of the rate-of-turn detected by gyroscope 5.

This is effected as follows:

The signal generated in the output leads of gyroscope 5 is applied to the input of an integrating circuit through an input transformer 105. The output from the integrating circuit, which output is an A. C. signal of the same frequency as source 20 but in quadrature therewith, is applied through output transformer 106 across a resistance 107. One output lead of gyroscope 5 is connected to one end 109 of resistance 107 and the input to amplifier 21 is connected to a slider 108 on resistance 107. Switch 51 is connected between arm 108 and resistance end 109 so that the output from the integrating circuit may be short-circuited during straight flight.

Turning now to the integrating circuit itself, the rate of roll signal applied to the input through transformer 105 is amplified in the valve 101, demodulated in the well-known form of demodulator illustrated at 102, and applied to a valve integrating circuit 103 of conventional design comprising two valves 110, 111 arranged in push-pull so that a signal proportional to the integral of the rate-of-roll appears between the anodes of the integrating valves. This signal is led through loading resistances 116, 117 to a modulator 104 the modulated output of which is applied to roll control circuit through transformer 106 as previously described.

The anodes of valves 110, 111 are connected together through resistance 113 and switch 112 which is closed during level flight and opened during a banked turn. Resistance 113 is small compared with anode loads 114, 115 and the input resistances 116, 117 of modulator 104. Hence when switch 112 is closed, the potentials of anodes 110, 111 are substantially the same so that the input to modulator 104 and hence the A. C. signal applied to the control circuit through transformer 106 is substantially a true integral of the rate-of-roll signal from the time when switch 112 is opened on the commencement of a turn.

In operation during straight flight the switches 51, 112 are closed and the switch 23 is open so that the monitoring control is exercised by the pendulum 7 to restore the aircraft to the level if after a disturbance in roll, the aircraft is stabilised by the rate-of-turn gyroscope at a position displaced from the level.

During a turn however the switches 51, 112 are open and the switch 23 is closed so that the aileron circuit is monitored in accordance with the integral of the rate of roll to maintain the platform 11 level during the turn.

I claim:

1. Apparatus for stabilising about an axis a body in an aircraft against rotational movements of the aircraft comprising means for measuring the rate of turn of the body about said axis, means for integrating the measured rate of turn, a gravity responsive monitoring device, a control system controlling the position of the body about said axis, and switching means operable to apply as an input to said control system either the output from the integrating means or the output from the gravity-responsive device according as to whether the aircraft is or is not subjected to acceleration forces other than gravity.

2. An apparatus for stabilizing a body in an aircraft against rotational movements about an axis thereof comprising means for measuring the rate of turn of the body about said axis, means for integrating the measured rate of turn, a gravity responsive monitoring device, a control system controlling the position of the body about said axis, said system having one input in accordance with the rate of turn of the body about said axis, and switching means operable to apply also as an input to said system either the output from the integrating means or the output from the gravity responsive device according as to whether the aircraft is or is not subjected to acceleration forces other than gravity.

3. Apparatus for stabilising about an axis a body in an aircraft against rotational movements of aircraft about said axis comprising a rate of turn device situated on the body and generating an electric A. C. signal in accordance with the rate of turn about said axis, electric circuits for demodulating, integrating and remodulating at the same frequency a part of the said signal, to produce an A. C. signal proportional to the integral of the measured rate of turn, a gravity responsive device generating an electric A. C. monitoring signal in accordance with the deviation of the body about said axis from a predetermined position, and means for controlling the body about said axis in accordance with said rate of turn signal and a monitoring signal, said monitoring signal being that from said device when the aircraft is on straight flight and that proportional to the integral of the measured rate of turn during a turn in azimuth.

4. An automatic control system for aircraft comprising a platform mounted for rotation about the roll axis in the aircraft, means for measuring the rate of turn about the roll axis positioned on the platform, means for integrating the measured rate of turn, a gravity responsive monitoring device measuring the deviation of the aircraft from the level, a control system controlling the position of the body about said axis, said system having one input in accordance with the rate of turn of the body about said axis, and switching means operable to apply also as an input to said system either the output from the integrating means or the output from the gravity responsive device according as to whether the aircraft is or is not subjected to acceleration forces other than gravity.

5. An automatic control system for aircraft comprising a platform mounted for rotation about the roll axis in the aircraft, a device positioned on said platform generating an A. C. signal in accordance with the rate of turn in roll, a gravity responsive monitoring device mounted on the aircraft generating an A. C. signal of the same frequency in accordance with the deviation of the craft from the level in roll, electric circuits for demodulating, integrating and remodulating at the same frequency a part of said rate of turn signal, an electric A. C. servo-motor controlling the ailerons of the aircraft, and switching means whereby said motor is controlled in accordance with said rate of turn signal and said deviation signal when the aircraft is on level flight and in accordance with said rate of turn signal and the signals emanating from said electric circuit when the aircraft is effecting a banked turn.

6. An automatic control system as claimed in claim 5 comprising also means for rotating said platform about the roll axis whereby banking of the aircraft is effected.

7. Apparatus for stabilising about an axis a body in an aircraft against rotational movement of the aircraft about said axis comprising means for measuring the rate of turn of the body about said axis, means for integrating the measured rate of turn, a gravity responsive monitoring device mounted upon the aircraft and giving a signal proportional to rotation of the aircraft about said axis and means for selectively exercising a monitoring control on the body in accordance with either the integral of the measured rate of turn or the response from said device according as to whether the device is or is not affected by accelerations other than that due to gravity, the body being controlled, by said last named means, in accordance with the said integral when the device is affected by acceleration other than that due to gravity, and in accordance with the said response when the device is affected by such other acceleration.

8. Apparatus for stabilising about an axis a body in an aircraft against rotational movement of the aircraft about said axis comprising means for measuring the rate of turn of the body about said axis, means for integrating the measured rate of turn to give a first monitoring signal, a gravity responsive monitoring device giving a second monitoring signal in accordance with the deviation of the body from a predetermined attitude in space about said axis and switching means connected to said integrating means and said gravity device, said switching means being selectively operable to switch in said first monitoring signal to exercise a monitoring control on the body when the aircraft is subjected to acceleration forces other than that due to gravity and for switching in said second monitoring signal to exercise a monitoring control on the body when the aircraft is not subjected to said forces.

9. Apparatus for stabilising about an axis a body in an aircraft against rotational movement about said axis comprising a rate of turn device situated on the body and generating an electric signal in accordance with the rate of turn about said axis, means for integrating said signal to produce a first electric monitoring signal, a gravity responsive device generating a second electric monitoring signal in accordance with the deviation of the body about said axis from a predetermined attitude in space and means for controlling the body about said axis in accordance with the said rate of turn signal and one of said first electric monitoring signal and said second electric monitoring signal according as to whether said gravity responsive device is or is not affected by accelerations other than gravity and means for connecting said controlling means with one of said integrating means and said gravity responsive means.

10. An apparatus for stabilizing a body in an aircraft against rotational movements about an axis thereof, comprising means for measuring the rate of turn of the body about said axis, means for integrating the measured rate of turn, a gravity responsive monitoring device, position control means for said body and selective connection means between said control means, said integrating means and said device, said selective connection means having two operating conditions, in one of which said position control means controls said body in response to said integrating means exclusive of any signal from said gravity responsive device during movement of said craft in turn and in the other of which controls said body in response to said gravity responsive device during straight flight of said craft.

11. The combination set forth in claim 10, said means for measuring rate of turn comprising a spring restrained gyro having only one precessional degree of freedom.

FREDERICK WILLIAM MEREDITH.

References Cited in the file of this patent

UNITED STATES PATENTS

| Number | Name | Date |
|---|---|---|
| 1,966,170 | Greene | July 10, 1934 |
| 2,014,825 | Watson | Sept. 17, 1935 |
| 2,361,790 | Noxon | Oct. 31, 1944 |
| 2,415,430 | Frische et al. | Feb. 11, 1947 |
| 2,432,036 | Noxon | Dec. 2, 1947 |